United States Patent [19]

Hutter

[11] Patent Number: 5,312,610
[45] Date of Patent: May 17, 1994

[54] DEFLUORINATION OF PHOSPHORIC ACID

[75] Inventor: Klaas J. Hutter, Pocatello, Id.

[73] Assignee: J. R. Simplot Co., Pocatello, Id.

[21] Appl. No.: 902,651

[22] Filed: Jun. 23, 1992

[51] Int. Cl.$^5$ .............................................. C01B 25/16
[52] U.S. Cl. .................................. 423/321.1; 423/341
[58] Field of Search ................... 423/321 R, 321.1, 341

[56] References Cited

U.S. PATENT DOCUMENTS

| 2,369,791 | 2/1945 | Moore . | |
|---|---|---|---|
| 2,447,359 | 8/1948 | Oakley, Jr. . | |
| 2,987,376 | 6/1961 | Gloss | 423/321 R |
| 3,151,941 | 10/1964 | Hollingsworth et al. | 423/321 R |
| 3,193,351 | 7/1965 | Miller et al. . | |
| 3,498,746 | 3/1970 | Smaltz et al. . | |
| 3,625,648 | 12/1971 | Randolph . | |
| 4,762,698 | 8/1988 | Yarnell et al. | 423/341 |

FOREIGN PATENT DOCUMENTS 967720  5/1975  Canada ................................ 423/321

OTHER PUBLICATIONS

M. D. Sanders et al., "Fluoroine Recovery From Wet Process Phosphoric Acid", 145th National Meeting of the American Chemical Society (Sep. 8-13, 1963).
M. English, "Florine Recovery From Phosphatic Fertilizer Manufacture", *Chemical and Process Engineering* (Dec. 1967).
R. A. Wiesboeck et al., "The Acid-Catalyzed Fluoride Evolution from Wet-Process Phosphoric Acid", The American Chemical Society National Meeting (Aug. 27–Sep. 1, 1972).
William E. Rushton et al., "Defluorination of Wet Process Phosphoric Acid", 85th National Meeting of American INstitute of Chemical Engineers (Jun. 1978).

*Primary Examiner*—Wayne Langel
*Attorney, Agent, or Firm*—Gregory Garmong

[57] ABSTRACT

Fluorine in the form of fluoride is removed from phosphoric acid having an initial phosphate concentration of less than about 50 percent by determining the concentration of fluoride to be removed from the acid and the concentration of silicon in the acid. Silica is added to the acid in an amount sufficient that the molar ratio of fluoride to be removed from the acid to silicon in the acid is about 6. The acid is concentrated to a final phosphate concentration of greater than about 50 percent, whereupon fluoride is reacted to fluosilicic acid. By maintaining the indicated concentration ratio of fluoride to be removed and silicon, fouling of condenser and scrubber components with deposited silica is avoided.

16 Claims, 2 Drawing Sheets

DEFLUORINATION OF PHOSPHORIC ACID

BACKGROUND OF THE INVENTION

This invention relates to the industrial processing of phosphoric acid, and, more particularly, to the removal of fluorine from phosphoric acid.

Phosphoric acid is widely used in commerce in the manufacture of various products, such as animal feed, food products, and fertilizer. Phosphoric acid is prepared by mining phosphate-containing ores and then producing an acid from those ores. In the "wet process", sulfuric acid is contacted to the mined ore, dissolving the phosphate values from the ore into the acid. The resulting dilute phosphoric acid is concentrated and processed to produce the required grade and purity of phosphoric acid.

In addition to the phosphate values, the sulfuric acid also dissolves other elements and compounds from the ore into the acid. These dissolved elements and compounds may be deleterious to the purity of properties of the final phosphoric acid, and therefore must be removed during the processing for certain applications. One such impurity is fluorine in the form of fluoride ion.

Phosphate-containing ore typically has a phosphorus-to-fluorine ratio of about 10. Laws regulate the amount of fluorine that may be present in animal feeds to levels judged to be safe for the animals and for consumers. Most states have laws setting the minimum phosphorus-to-fluorine ratio at 100/1. It is therefore necessary to reduce the amount of fluorine in the acid to reach the appropriate legal limit.

Several techniques are known for reducing the fluorine content of phosphoric acid. In one approach, such as described in U.S. Pat. No. 3,193,351, silica is added to the phosphoric acid. Silica reacts with various combined forms of the fluoride ion to produce silicon tetrafluoride. Silicon tetrafluoride has a high vapor pressure and is more volatile than most other combined forms of the fluoride ion. It can be driven out of the phosphoric acid during heating and concentration of the acid to merchant-grade or superphosphoric-grade acid.

Silica addition to phosphoric acid is widely used industrially to reduce the fluoride content of the acid. However, it has been observed that the use of silica additions can lead to fouling of system components such as condensers and scrubbers, or to a need for excessive filtering of the acid. There is a need for an improved approach to the production of low-fluoride-content phosphoric acid, suitable for industrial applications such as the production of animal feed. The present invention fulfills this need, and further provides related advantages.

SUMMARY OF THE INVENTION

The present invention provides an improved process for the production of phosphoric acid of reduced fluoride content, starting from high-fluoride, silica-deficient phosphoric acid. This approach achieves phosphorus-to-fluorine ratios in excess of 100/1. Fouling of the defluorination apparatus, particularly the condenser and scrubber, by precipitated silica is avoided, and there is no excess silica to be removed from the acid.

In accordance with the invention, a method for producing defluorinated phosphoric acid comprises the steps of providing phosphoric acid and determining the concentration of fluoride to be removed from the acid and the concentration of silicon in the acid. The process further includes adding silica to the acid in an amount sufficient that the molar ratio of fluoride to be removed from the acid to silicon in the acid is about 18/3 (i.e., 6). Stated alternatively, the silica is added in an amount sufficient that the ratio of molar concentration of hydrogen fluoride in the acid to molar concentration of silicon tetrafluoride in the vapors is about 2/1.

In a preferred approach, the phosphoric acid has an initial phosphate concentration of less than about 50 percent, and most preferably about 48 percent. This initial phosphoric acid is conveniently supplied by diluting merchant-grade phosphoric acid having an initial phosphate concentration of about 50-54 percent. The concentration of fluoride to be removed from the acid is determined as the difference between the measured fluoride content of the acid and the required fluoride content to meet the applicable standard. The concentration of silicon in the acid is measured. Silica is added to the acid in an amount sufficient that the ratio of molar concentration of fluoride to be removed from the acid to molar concentration of silicon in the acid is about 6. The silicon-treated acid is concentrated to a final phosphate concentration of greater than about 50 percent, to merchant-grade acid of 54 percent phosphate, or, preferably, to superphosphoric acid of 68-72 percent phosphate.

The selected silica addition is made in recognition of the principal reaction chemistry of the fluoride reduction. Consideration of the overall reaction chemistry shows that for each 18 moles of fluoride removed by the principal removal reaction, 3 moles of silicon is removed. Thus, ideally, 3 moles of silicon in the form of silica (silicon dioxide) is provided for each 18 moles of fluoride ion to be removed. The partial reactions that lead to the overall reaction demonstrate that, if this 18/3 molar ratio of fluoride ion to silicon is maintained, the molar ratio of hydrogen fluoride (HF) to silicon tetrafluoride ($SiF_4$) will be 2/1. These partial reactions also demonstrate that, where the indicated ratios are at least approximately maintained, there will be no excess silica present that deposits in apparatus or that must be removed as by filtering.

The present invention therefore provides an advance in the art of industrial production of low-fluoride phosphoric acid. Other features and advantages of the present invention will be apparent from the following more detailed description of the preferred embodiment, taken in conjunction with the accompanying drawings, which illustrate, by way of example, the principles of the invention.

DETAILED DESCRIPTION OF THE INVENTION

The present invention is based upon recognition of the dominant fluoride species present during defluorination of phosphoric acid, and the chemical interaction of these species during the defluorination process. The dominant fluoride species present are silicon tetrafluoride ($SiF_4$) and hydrogen fluoride (HF). Silicon tetrafluoride is more volatile than hydrogen fluoride.

The primary chemical reactions applicable in downstream scrubbing equipment and condensers during defluorination are the hydrolysis of silicon tetrafluoride to fluosilicic acid ($H_2SiF_6$), $$3\ SiF_4\ (g) + 2\ H_2O = 2\ H_2SiF_6 + SiO_2\ (s)$$

and the reaction of silica with hydrogen fluoride, $$6\ HF(g) + SiO_2 = H_2SiF_6 + 2\ H_2O.$$

As long as the molar ratio of hydrogen fluoride to silicon tetrafluoride is at least about 2, no reactively produced silica will be present to deposit onto system components.

The sum of the above reactions is $$3\ SiF_4\ (g) + 6\ HF(g) = 3\ H_2SiF_6\ (l).$$

For each 18 moles of fluoride ion that is removed, 3 moles of silicon is consumed. The silicon is provided as reactive silicon dioxide, so that for each 18 moles of fluoride ion that is removed, 3 moles of silicon dioxide is consumed. As long as the reactive silicon dioxide is added to maintain the ratio of 18 moles of fluoride to be removed per 3 moles of silicon dioxide added, no excess silicon dioxide will be present, which must be removed from the acid as by filtration, and no reactively produced silicon dioxide will be present that can deposit as a scale on the defluorination equipment such as scrubbers and condensers.

Other chemical reactions occur in the phosphoric acid and defluorination equipment as the defluorination proceeds. These reactions are either subsidiary to those indicated, or occur to a lesser extent, or involve constituents present in relatively minor amounts. The indicated reactions therefore predominate in the chemical defluorination process and form the basis for the present invention.

Figure 1:
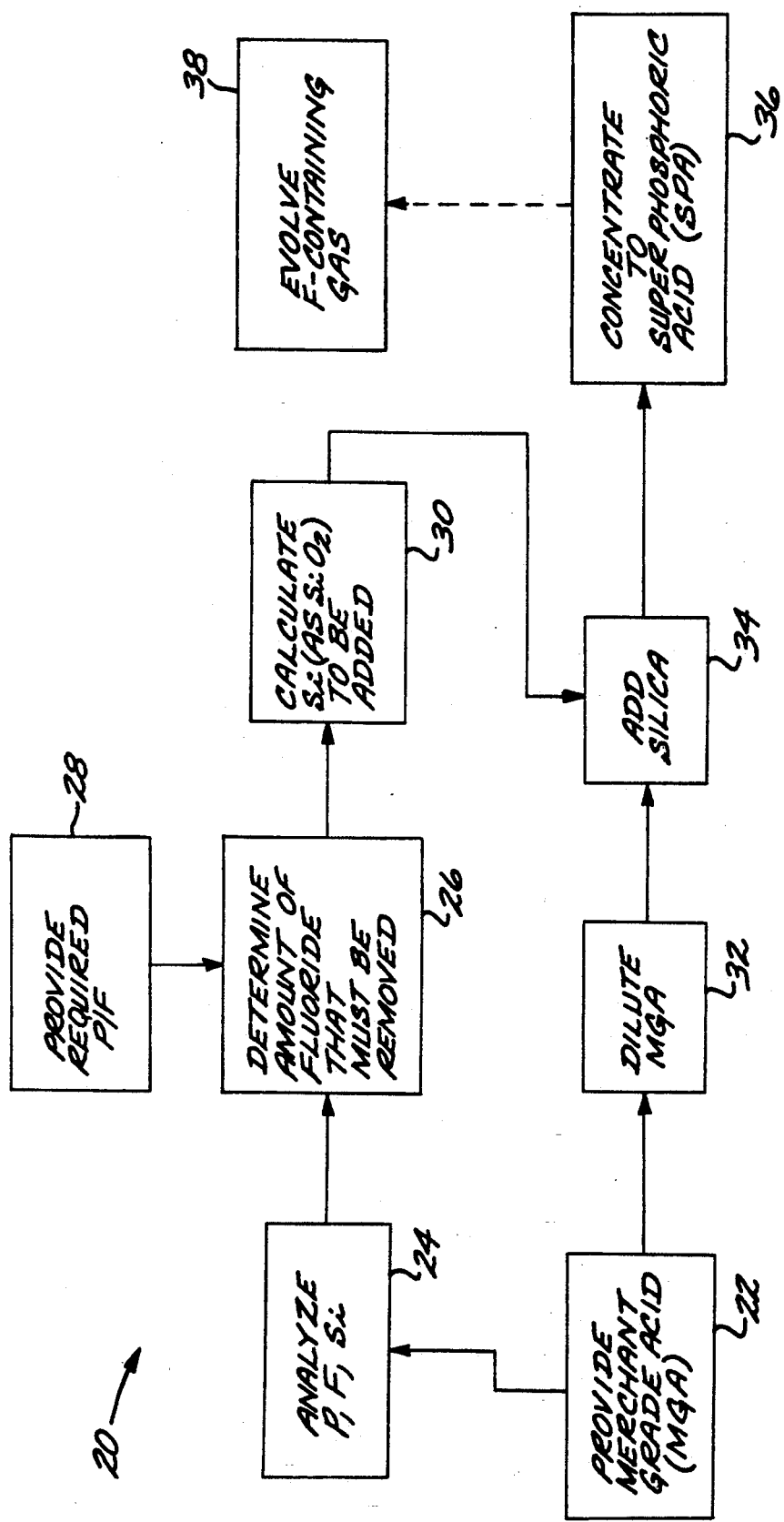
FIG. 1 is a process flow chart for the production of low-fluoride phosphoric acid.
Figure 2:
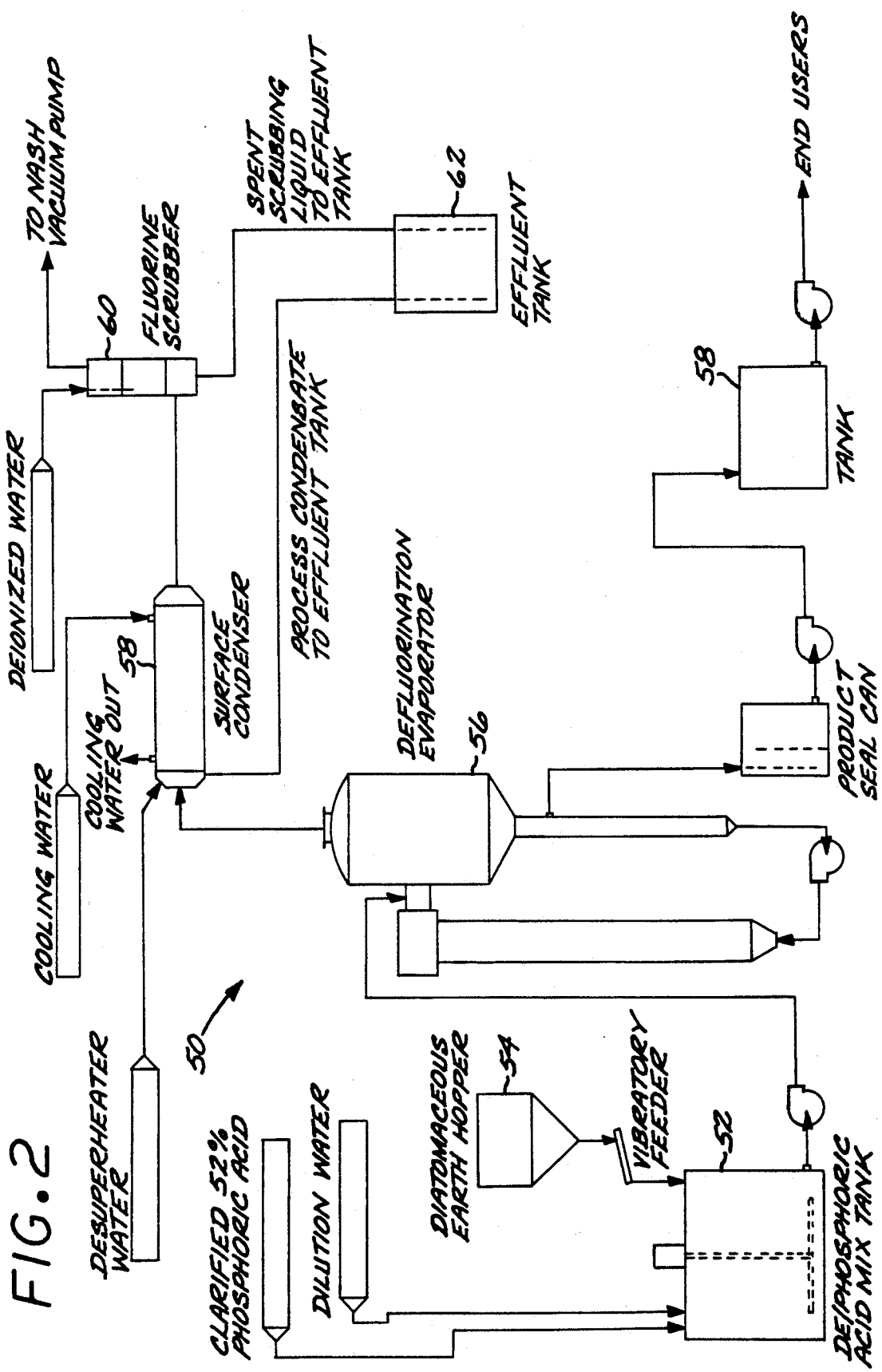
FIG. 2 is a schematic pictorial representation of apparatus that may be employed in practicing the invention.

FIG. 1 indicates schematically the preferred defluorination process 20 of the invention, while FIG. 2 depicts an apparatus 50 with which the process 20 is used. It will be appreciated that the practice of the invention is not limited to this preferred process and apparatus, but instead that the inventor prefers to utilize the invention in this manner. Merchant-grade phosphoric acid of about 52-54 percent by weight phosphate content is provided, numeral 22, to a mix tank 52. The phosphorus, fluorine, and silicon contents of the acid are determined, numeral 24. In the preferred practice, a sample is taken before the acid reaches the mix tank 52 and chemically analyzed for phosphorus, fluorine, and silicon contents, but statistical information can be used instead in many instances. The actual phosphorus-to-fluoride ratio of the acid is calculated from this information.

The required amount of reduction in fluoride content is determined, numeral 26. The reduction is calculated from the required phosphorus-to-fluorine (P/F) molar ratio, numeral 28, which is typically somewhere in the range of 100-175. This value is determined from the eventual use planned for the final product, and is a predetermined value for any particular application of the process. From the required value of P/F, the actual measured value of P/F of the acid, and the P content, the amount of fluoride that must be removed per unit weight of acid (for a batch process) or flow rate of acid (for a continuous process) is determined by arithmetic substitution. From this result and the previously discussed required molar ratios (i.e., F removed/Si = 18/3), the number of moles of silicon dioxide that is to be added (batch process) or the addition flow rate of silicon dioxide (continuous process) is determined, numeral 30.

In the preferred process, the merchant-grade phosphoric acid is diluted to a phosphate concentration of less than about 50 percent by the addition of water, numeral 32, in the mix tank 52. The phosphorus concentration of the diluted acid is preferably about 48 percent phosphate. Reactive silica, such as in the form of finely divided diatomaceous earth, is added, numeral 34, to the diluted acid in the mix tank 52, from a supply 54 in the amount determined in step 30. The reactive silica is thoroughly mixed with the acid to permit good reaction.

The diluted acid is piped to an evaporator 56 and therein concentrated, numeral 36, to a concentration of greater than 50 percent phosphate content. Preferably, the acid is concentrated to superphosphoric-grade acid of 68-72 percent phosphate by heating it to elevated temperature to drive off water and, at the same time, evolve fluoride ion in the form of silicon tetrafluoride and hydrogen fluoride, numeral 38. At the elevated temperature, the silicon dioxide is consumed according to the reactions discussed earlier, leaving little or no silicon dioxide to be removed or to deposit in the defluorination equipment.

From the evaporator, the concentrated defluorinated acid is piped to a tank 58 and stored for subsequent use. The evaporated water and the stripped silicon tetrafluoride and hydrogen fluoride are condensed in a condenser 58. The condensate is stored in an effluent tank 62. The vapors are scrubbed in a fluorine scrubber 60 to remove silicon tetrafluoride and hydrogen fluoride, and the scrubbing liquir is also stored in the effluent tank 62.

The controlled addition of silicon dioxide to the acid in the mix tank 52 is particularly important in avoiding scaling of the condenser 58 and the scrubber 60. Excess addition of silicon dioxide will cause the silicon tetrafluoride hydrolysis reaction to predominate and silica will precipitate in the condenser 58 and the scrubber 60. Insufficient addition of silicon dioxide will result in an incomplete reaction and too high a fluoride content (a low P/F) in the final product.

In conventional practice, no silica is added to the merchant-grade acid. The predominant fluoride species is hydrogen fluoride, which is less volatile. Hence, defluorination is less energy efficient (more steam is required to reduce the fluoride concentration to required values). In the present approach, the adjusted composition of the acid is such that the silicon dioxide does not form, avoiding the scaling of the condenser 58, the scrubber 60, and other components downstream of the evaporator 56.

A plant test was performed following the process shown in FIG. 1. In this test, merchant-grade phosphoric acid having a phosphate content of 54.0 percent was diluted by the addition of water to a phosphate content of 47.5 percent. The merchant-grade phosphoric acid had a fluorine content of 0.70 percent F, for a P/F molar ratio of 34, and an initial silica content of 0.07 percent. The required P/F content of the final acid was 110-120. Reactive silica in the form of calcined diatomaceous earth was added (step 34 of FIG. 1) to the diluted acid in the mixing tank 52 at a rate of 7 pounds of silica per ton of acid. The acid was processed through the forced recirculation evaporator 56. The acid in the evaporator is kept at a temperature of 350°-400° F. by a heat exchanger at an absolute pressure of 2-4" HgV. Water vapor containing stripped fluoride species is continually removed from the vapor space above the boiling acid and passed to the condenser 58. The resulting acid had a measured fluoride content of 0.26 percent, for a P/F of about 114. On some occasions, the silica addition was discontinued. The P/F of the final product acid dropped to about 85, an unacceptably low value.

The evaporator reactor was operated for two days. In the present approach, no silica deposits were observed.

The present invention thus provides an advance in the art of removal of fluoride from phosphoric acid. Although a particular embodiment of the invention has been described in detail for purposes of illustration, various modifications may be made without departing from the spirit and scope of the invention. Accordingly, the invention is not to be limited except as by the appended claims.

What is claimed is:

1. A method for producing defluorinated phosphoric acid, comprising the steps of:
    providing phosphoric acid;
    determining the concentration of fluoride to be removed from the acid and the concentration of silicon in the acid;
    adding silica to the acid in an amount sufficient that the molar ratio of fluoride to be removed from the acid to silicon in the acid is about 18/3; and
    removing fluorine from the phosphoric acid in a manner such that silicon tetrafluoride hydrolyzes and silica reacts with hydrogen fluoride.

2. The method of claim 1, wherein the concentration of fluoride to be removed from the acid is determined as the difference in the concentration of fluoride in the acid less the required concentration of fluoride in the acid.

3. The method of claim 1, wherein the step of removing includes the step of
    concentrating the acid by evaporating water from the acid, whereupon fluorine in the form of volatile fluorine compounds is removed from the acid.

4. The method of claim 3, wherein the step of concentrating includes the step of
    applying a partial vacuum over the surface of the acid.

5. The method of claim 3, including the additional step, after the step of concentrating, of
    condensing the evaporant.

6. The method of claim 3, wherein the acid is concentrated to a phosphate concentration of greater than 50 percent.

7. The method of claim 1, wherein the silica is added in the form of diatomaceous earth.

8. A method for producing defluorinated phosphoric acid, comprising the steps of:
    providing phosphoric acid;
    determining the concentration of fluoride to be removed from the acid and the concentration of silicon in the acid;
    adding silica to the acid in an amount sufficient that the ratio of molar concentration of HF in the acid to molar concentration of $SiF_4$ in the acid is about 2/1; and
    removing fluorine from the phosphoric acid in a manner such that silicon tetrafluoride hydrolyzes and silica reacts with hydrogen fluoride.

9. A method for producing defluorinated phosphoric acid, comprising the steps of:
    providing phosphoric acid having an initial phosphate concentration of less than about 50 percent and characterized by a fluorine reaction during concentration by heating according to a relation: $3\ SiF_4(g) + 6\ HF(g) = 3\ H_2SiF_6$;
    determining the concentration of fluoride to be removed from the acid and the concentration of silicon in the acid;
    adding silica to the acid in an amount sufficient that the molar ratio of fluoride to be removed from the acid to silicon in the acid is about 18/3; and
    concentrating the acid by heating, to a final phosphate concentration of greater than about 50 percent.

10. The method of claim 9, wherein the initial phosphate concentration is about 48 percent phosphate.

11. The method of claim 9, wherein the final phosphate concentration is about 68-72 percent.

12. The method of claim 9, wherein the step of providing is accomplished by
    supplying phosphoric acid having a phosphate concentration of more than about 50 percent, and
    diluting the phosphoric acid having a phosphate concentration of more than about 50 percent to a concentration of less than about 50 percent.

13. The method of claim 9, wherein the concentration of fluoride to be removed from the acid is determined as the difference in the concentration of fluoride in the acid less the required concentration of fluoride in the acid.

14. The method of claim 9, wherein the step of concentrating is accomplished at a constant acid temperature of from about 350 F. to about 400 F. with a partial vacuum applied to the surface of the acid.

15. The method of claim 9, including the additional step, after the step of concentrating, of
    condensing the evaporant.

16. The method of claim 9, wherein the silica is added in the form of diatomaceous earth.

* * * * *